(No Model.) 4 Sheets—Sheet 1.

G. BEEKMAN.
COTTON HARVESTER.

No. 427,218. Patented May 6, 1890.

WITNESSES:
H. F. Parker
Eugene Lucas

INVENTOR
Gerard Beekman

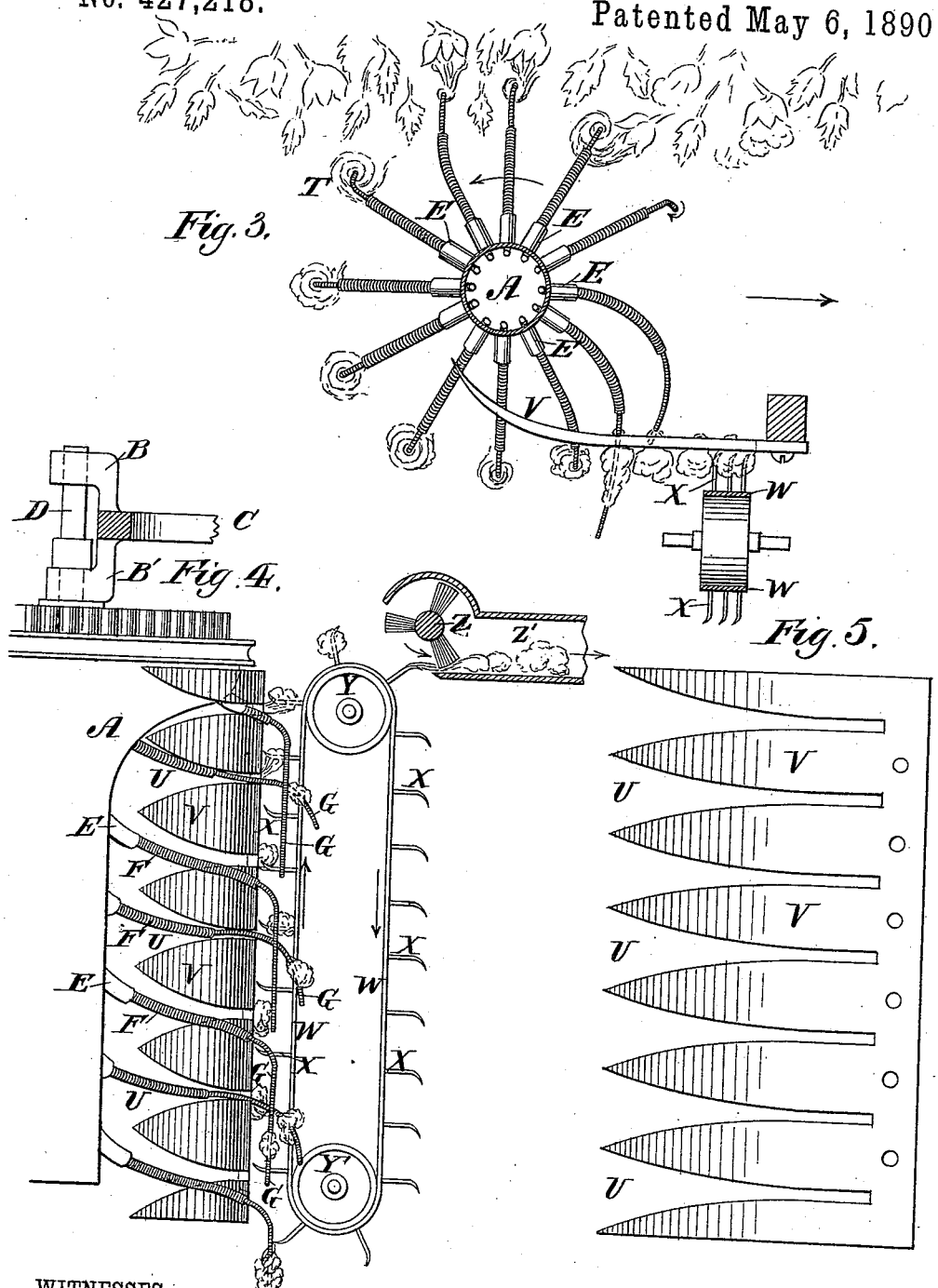

(No Model.) 4 Sheets—Sheet 3.

G. BEEKMAN.
COTTON HARVESTER.

No. 427,218. Patented May 6, 1890.

WITNESSES:
H. F. Parker
Eugene Lucas

INVENTOR
Gerard Beekman

THE NORRIS PETERS CO., PHOTO-LITHO., WASHINGTON, D. C.

(No Model.)
4 Sheets—Sheet 4.
G. BEEKMAN.
COTTON HARVESTER.
No. 427,218. Patented May 6, 1890.
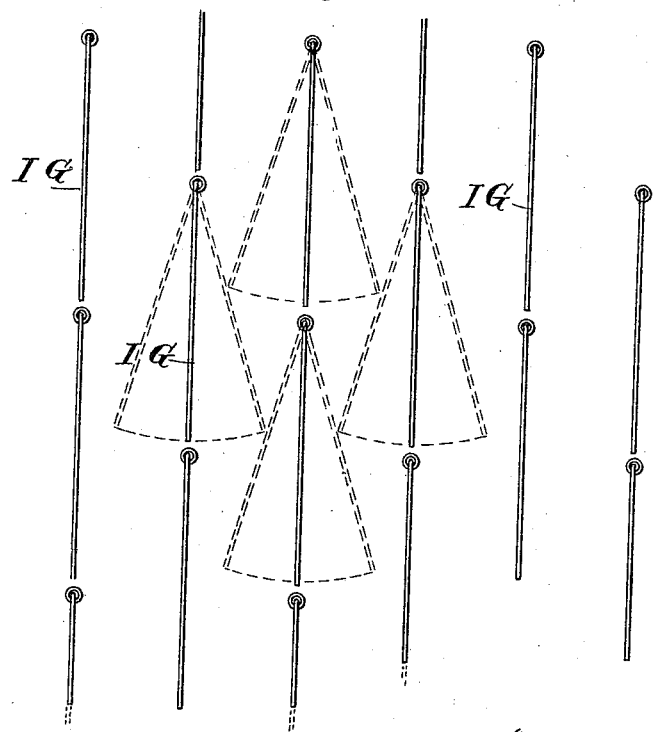
WITNESSES:
H. F. Parker
Eugene Lucas
INVENTOR
Gerard Beekman

United States Patent Office.

GERARD BEEKMAN, OF NEW YORK, N. Y.

COTTON-HARVESTER.

SPECIFICATION forming part of Letters Patent No. 427,218, dated May 6, 1890.

Application filed March 2, 1886. Serial No. 193,708. (No model.)

*To all whom it may concern:*

Be it known that I, GERARD BEEKMAN, a citizen of the United States, residing at New York, in the county of New York and State of New York, have invented certain new and useful Improvements in Cotton-Harvesters, of which the following is a specification, reference being had therein to the accompanying drawings, in which—

Figure 2:
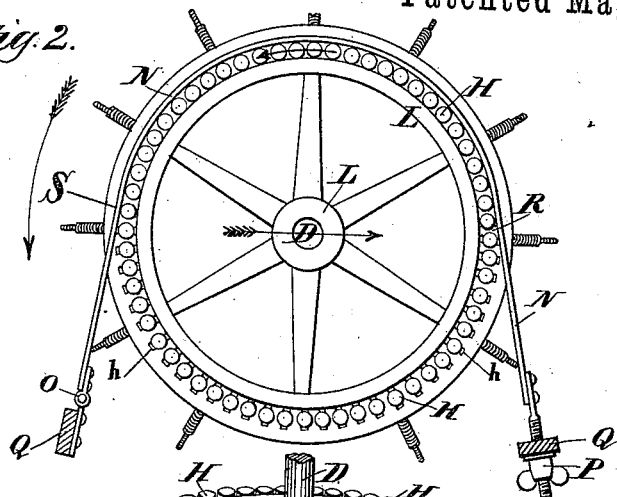
Figure 1:
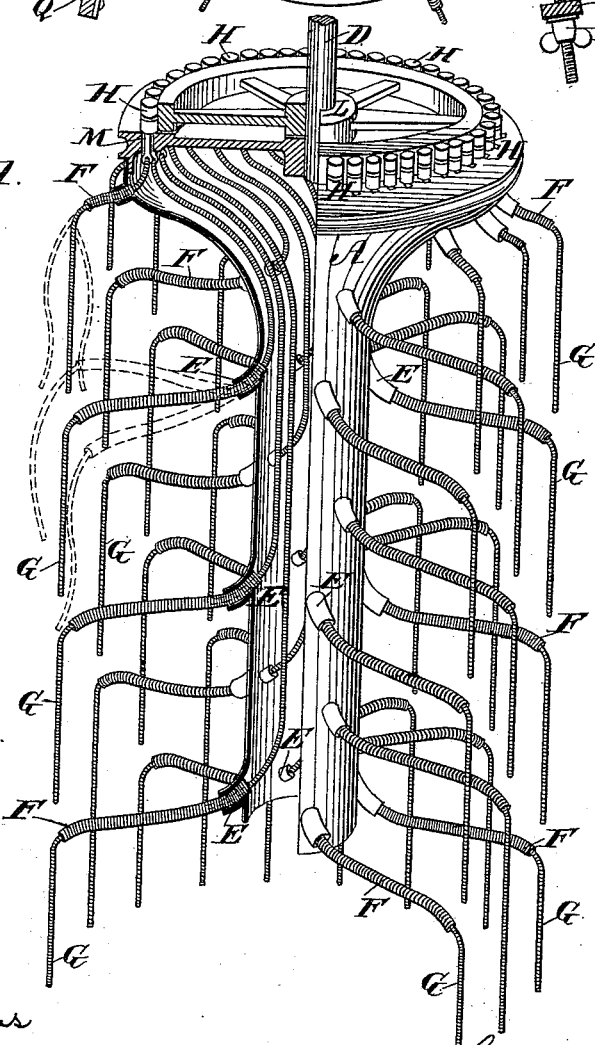
Figure 6:
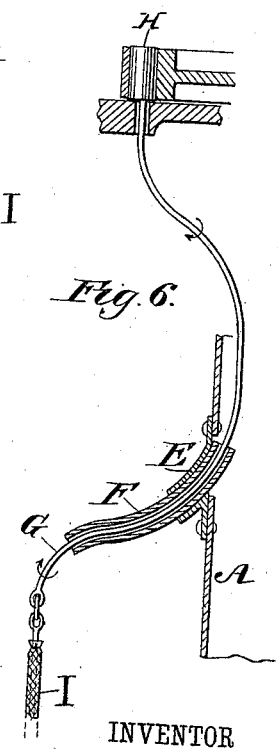

Figure 1 represents in perspective a side view of my improved picking mechanism and central support, a part of the support being cut away to show the interior. Fig. 2 represents a plan view of a means of rotating the pickers. Fig. 3 represents a plan view of the pickers in contact with the plant and the cleaning mechanism. Fig. 4 represents a side view of stripping and cleaning mechanism and of part of the picking mechanism. Fig. 5 represents a side view of the stripping mechanism. Fig. 6 shows an alternative means of supporting and imparting motion to the picker. Figs. 7, 8, 9, 10, and 11 show alternative forms of pickers. Fig. 12 shows "staggered" position of pickers. Fig. 13 shows the action of a picker on cotton. Fig. 14 shows an enlarged view of a portion of the device for rotating the pickers.

My invention relates to that class of cotton-harvesters in which the picking mechanism rotates backward at substantially the same rate of motion as that of the machine over the ground; and the objects of my improvements are, first, to provide an improved form of picking device; second, to provide an improved method of rotating the individual pickers; third, to provide an improved method of cleaning the pickers and carrying the cotton to a receiver. I attain these objects by the mechanism illustrated in the accompanying drawings above mentioned, in which similar letters refer to similar parts throughout the several views.

Fig. 1 shows the rotating support A for the pickers. The outer side, nearest the plant, should be made to rotate backward at substantially the same rate of motion as that of the machine over the ground. This may be accomplished by mechanism substantially as shown in Letters Patent granted to me May 25, 1880, No. 227,949, or in any other suitable way. This support is preferably hung in the machine in a double bearing B B', Fig. 4, which is rigidly attached to the frame of the machine C; and I prefer that the support A should not have a bearing at its lower end, but should be left free, as shown in Figs. 1 and 4. It is preferably so hung that the lower end shall be about a foot above the ground, and that its top shall be a few inches above the tops of the plants. The form of the support A is preferably that of a hollow tube flaring at its upper end, as shown in Fig. 1, or in the form of an inverted truncated cone, and it should be as small as is consistent with capacity for containing the mechanism hereinafter described for rotating the pickers. In its sides are arranged a suitable number of apertures or nipples E E, shown in the drawings as short rigid tubes, and preferably projecting downward and outward and in staggered positions, as shown in Figs. 1 and 12. In each of the apertures or nipples E E is securely fastened an elastic tubular arm F F, which may be made of a coil of steel wire known as "elastic belting," of rubber, or other elastic material, as shown in Figs. 1, 3, and 4. These elastic tubular arms are preferably longer at the bottom than at the top of the support A, so that their outer ends will all hang at about the same distance from the center of the support A. These nipples E E should be arranged upon the support A at such distance apart that the outer ends of the elastic arms F F shall be about four inches apart in staggered positions, these outer ends thus forming an elastic cylinder supporting the pickers hereinafter described and which will readily yield to the irregularities of the plant, while the elastic arms will project between the limbs of the plant. The angles at which these elastic arms project downward from the support A, I prefer to have correspond approximately with the angle at which the limbs of the cotton-plant grow upward. Thus the lower elastic arms are preferably made more horizontal than those above. When the rows of cotton-plants are planted about three feet apart, this cylinder may be eighteen inches to two feet in diameter. I prefer that the elastic arms should have as small a diameter as is consistent with due strength and the free rotation of the elastic shafting contained in them, so as to occupy as little space in the cotton-bush as possible. The arms F F may be rigid as well as elastic, Fig. 6.

Figure 7:
Figure 8:
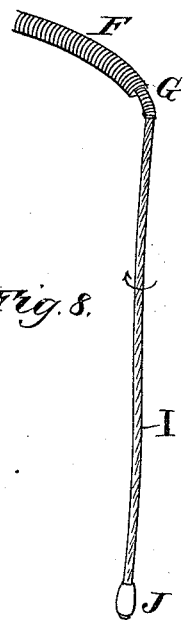
Figure 10:
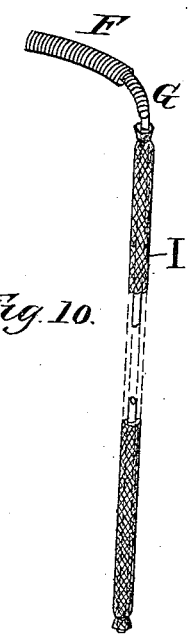
Figure 11:
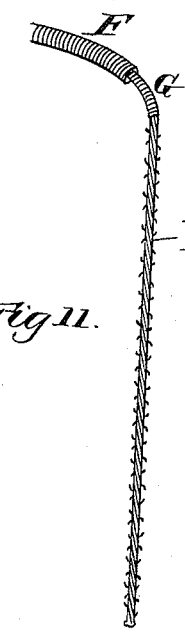

The method of suspending the pickers and rotating the same is as follows: Through the elastic arms F F and through the nipples or apertures E E, and upward through the central support A, pass the flexible rotating shafts, each of which projects beyond the end of its elastic arm F, for the attachment of the picker, and at its other end, at the top of the support A, it is connected with the spool H or suitable device for imparting the rotary motion. These elastic shafts may be composed of spiral elastic belting, as shown in Fig. 1, or of a single delicate steel wire, as shown in Fig. 6. The twisting motion imparted to the spools H H will thus be conveyed throughout the length of each elastic shaft. The pickers I are attached each to the end of one of the elastic shafts G, as shown in Figs. 6 to 11, or the picker may be a continuation of the elastic shaft itself, as shown in Figs. 1 and 4. These pickers hang loosely from the ends of the elastic shafts G; but when cord pickers are used they may have a small weight J at the lower end, as shown in Fig. 8, to prevent kinking. Their length should be sufficient to cover the diagonal formed by the staggering of the outer ends of the elastic arms F F, so that when the elastic arms F F and the pickers I are in their normal position at rest the lower end of each picker will hang nearly as low as the top of the one next below it, as shown in Fig. 12. When the machine is in motion over rough ground, each picker will have not only a twisting motion, but also a swinging motion, as indicated in dotted lines in Figs. 1 and 12, thus covering a larger space and searching the plants more thoroughly for the fibers of cotton. I do not confine these pickers to swinging or hanging pickers; they may be supported by the arm F in any suitable position. If more than one picker is used in connection with each arm F, these pickers may radiate from the end of the arm as from a center, but the pickers should be flexibly connected with the rotating machinery either by elastic arms F and shafting, Fig. 1, or in case rigid arms F are used by a flexible connection with the rotating mechanism at or near the outer end of the rigid arm F, Fig. 6. The form of the picker itself may be either the continuation of the elastic belting, as shown in Fig. 1, or if attached to the end of said shaft it may be a simple string or cord, as shown in Figs. 7 and 8, or a metal rod covered with a webbing of cotton or other fibrous material, as shown in Fig. 10, or a barbed-wire cord or roughened wire, as shown in Fig. 11. I prefer to use the devices shown in Figs. 10 and 11, as they more readily take hold of and wrap upon themselves the fibers of cotton, as described in Letters Patent granted to me December 22, 1885, No. 332,865, and I prefer to use them of very small diameter, as they are less likely to abrade and mix with the cotton the delicate leaf-fringes that surround the boll. Thus, when a cord is used, I have found that it is best to employ one of about the diameter of trout-line, and when wire or covered wire is used it is best to employ one of equally small diameter. These loosely-hanging pickers, when rotated, not only wrap the fibers of cotton around themselves, but each picker also tends to twist the cotton into a rope between itself and the boll upon which it operates, by each fiber of cotton roping itself upon the next, and thus forming a continuation of the picker, as shown in Fig. 13.

Figure 9:

Fig. 9 shows a cord-picker hanging loosely beside a guide-rod K, which may be attached to the end of the elastic arm either rigidly or with a hinge. The object of this guide-rod is to prevent the picker from throwing off the cotton by a back twist after it is extricated from the boll, and when the elastic shafting is thus suddenly relieved from torsion.

The method of imparting motion to the spools or rollers H, and thus to the elastic shafting G, is shown in Fig. 2 and also in Fig. 1 with part cut away. The rollers H H are each mounted upon the short shaft M, Figs. 1 and 14, each in a suitable slot or loose bearing in the top of the central support or truncated cone A. Within the rollers and loosely mounted on the shaft D of said truncated cone A is the idle or friction wheel or pulley L, in such position that the rollers H will roll upon its outer edge when pressed upon it by the belt N. This belt N is flexible or elastic, and is composed of rubber, leather, or other suitable material. The belt passes around the outside of said rollers H H and comes in contact with them on the side of the machine nearest the plants, as shown in Fig. 2, and by its flexibility adjusts itself to the several rollers H H, Fig. 14. It is fastened to the frame Q of the machine at O and P, preferably by a hinge at O, and by an adjustable tension-screw at P. Thus when the central support or truncated cone A rotates the rollers H are forced between the belt N and the friction-wheel L at R, and throughout about one-half the revolution of A they have a rapid rotation given to them by frictional contact with the belt, and when they reach the point S they are released and cease to rotate, and, being loosely mounted in their bearings or slots $h\ h$, they fall away from the friction-wheel L, and thus leave the pickers with which they are connected idle and free to the action of the stripping mechanism. Each of these rollers H should preferably have a groove corresponding with a projection in the periphery of the idle-wheel L, and also with a corresponding projection in the belt N, Fig. 14, the wheel L having suitable bearings to prevent it from rising upon the shaft D. The projection upon its periphery will prevent the rollers H from rising above it, and in the same way the projection upon the belt N, fitting the groove in the rollers, will keep the belt in position.

The operation of the entire picking apparatus above described is as follows: When the elastic cylinder formed by the rotating pickers G, loosely hanging from the elastic arms F, comes in contact with a cotton-plant, the branches of the plant enter the cylinder between the rotating pickers, and as the pickers so in contact are moved backward at substantially the same rate of motion as that of the machine over the ground by the revolution of the elastic cylinder each rotating picker in respect to the limb of the plant nearest to it has a motion first toward the center of the plant and then away from the center. Thus the tendency of each rotating picker will be to follow the branch with which it first comes in contact from one extremity to the other and to take hold of the fibers of cotton growing upon it. As soon as it obtains a hold upon the fibers its pull will constantly increase, both by the wrapping of the fibers around the picker and also by the tendency to twist the fibers into a rope beyond the end of the picker, as shown in Fig. 13, and thus extricate all the cotton from the bottom of the boll. At the same time the loose hanging of the pickers G and the small diameter and elasticity of the arms F will prevent injury and abrasion to the plant and allow the cotton to be extracted unmixed with broken leaves and twigs. As the plant passes away from the pickers at the rear of the machine the pull of the machine will aid in extracting the cotton. The pickers, with the cotton wrapped around them, or hanging in rope-like form from their ends, as shown in Fig. 3, will then, as they leave the plant at T, be carried to the inside of the machine, where the process of stripping and cleaning takes place, the rotation of the pickers at this time ceasing by reason of the rollers H passing beyond the position where they are acted upon by the belt N.

On the inner side of the harvester, farthest from the plant, are placed the strippers V, Figs. 3, 4, and 5, consisting of a comb of metal plate, the teeth of which project toward the rear of the harvester, and each of which preferably tapers to a point by a gradual curve, as shown in Figs. 4 and 5. The points of the teeth also curve toward the central support A, as shown in Figs. 3 and 4, and their distance from one another corresponds with the distance of the rows of elastic arms F above one another. Thus each elastic arm F and its corresponding picker I and G will enter the converging space U, corresponding to its height. The pickers will be carried by the revolution of the cylinder and central support A into the narrow spaces U U between the teeth V V, and the cotton will be stripped or combed from them, and will be held in masses in the narrow spaces between the teeth, or will fall to the bottom of the comb on the side opposite to the elastic cylinder. From the point where the cotton is thus deposited it may be easily removed and conveyed to a receptacle. A simple way of removing it is by an endless belt W, Figs. 3 and 4, with a series of hooks X, projecting toward the teeth V, and curving upward at their ends. The endless belt W extends over the pulleys Y Y', which are preferably so rotated that the belt passes upward on the side toward the strippers V. This belt W is operated by suitable connections with the mechanism rotating the central support A.

At a suitable position, and preferably at the top of the endless belt W, and at the point where the hooks in their passage over the pulley Y point away from the stripper V, I place a suitable brush Z, rapidly rotated by connection of its shaft with the mechanism of the harvester, said brush being contained in a suitable channel-way Z', through which the cotton is driven by said brush and the draft of air caused by it into a basket or other receptacle. The brush Z may be constructed with two or three rows of bristles, with spaces between them, forming a revolving fan and brush combined.

What I claim, and desire to secure by Letters Patent, is—

1. In a machine for harvesting cotton, one or more elongated pickers, flexible throughout their length and free at one end, and connected at the other end with suitable mechanism for rotating each picker upon its longitudinal axis, all portions of the entire length of said pickers being adapted to engage and extract the cotton from the boll of the plant by spinning the cotton upon itself, all constructed and arranged substantially as described.

2. In a machine for harvesting cotton, two or more pickers revolving horizontally about a common axis, each picker rotating upon its longitudinal axis and supported at one end by an arm, the other end being free, and each picker connected by elastic shafting with suitable mechanism for rotating the same, substantially as described.

3. In a machine for harvesting cotton, one or more flexible pickers, each supported at one end by an elastic arm, which is attached at one end to the machine, the other end of said picker or pickers being free, and each picker being connected with suitable mechanism for rotating the same, substantially as described.

4. In a machine for harvesting cotton, one or more pickers, each supported at one end by a hollow elastic arm, the other end being free, and each picker being connected with and rotated by flexible shafting passing through the elastic arm and adapted to be rotated by suitable mechanism, substantially as set forth.

5. In a machine for harvesting cotton, a series of elastic arms arranged in staggered positions on a vertical revolving support, and each supporting a picker and surrounding a flexible shafting adapted to be rotated by a spool or drum situated at the end of the said support, to which spool or drum the flexible shafting is connected, substantially as set forth.

6. In a cotton-harvester, a picking-cylinder formed of elastic arms projecting laterally from the different sides of a central cylindrical support, with suitable mechanism for rotating the said support, each elastic arm supporting a flexible swinging picker, to which is attached a flexible shaft passing through one of the elastic arms and adapted to be rotated by a spool or drum to which the shaft is connected, substantially as set forth.

7. In a machine for harvesting cotton, a system of elastic pickers, composed of a central hanging support A, with suitable mechanism for rotating the same, and having its lower end free and containing a series of swinging pickers, each connected with an elastic arm, and with suitable mechanism for rotating the same, substantially as described.

8. In a machine for harvesting cotton, a series of flexible pickers, substantially as described, each connected with a roller H for rotating the same, said rollers having their bearings in a revolving central support A, in combination with a stationary adjustable belt N, in contact with said rollers during a portion only of their revolution, substantially as described.

9. In a machine for harvesting cotton, a series of pickers, each connected with a roller H for rotating the same, said rollers having their bearings in a revolving central support, in combination with the stationary flexible belt N and an idle-wheel L in contact with said rollers during a portion only of their revolution, substantially as described.

10. In a machine for harvesting cotton, a series of pickers, each connected with a roller H, having its bearings in the revolving central support A, in combination with the idle-wheel L upon the shaft of said central support, and adjustable belt N in contact with said rollers, substantially as described.

11. In a cotton-harvester, the stripping-plates V V, in combination with the pickers G, each picker projecting from an elastic arm F, and rotating upon its longitudinal axis by means of suitable mechanism, substantially as described.

In testimony whereof I affix my signature, in presence of two witnesses, this 27th day of February, 1886.

GERARD BEEKMAN.

Witnesses:
MORRIS B. BRONNER,
WM. H. HAESELBARTH.